United States Patent [19]
Aksyuk et al.

[11] Patent Number: 6,148,124
[45] Date of Patent: Nov. 14, 2000

[54] WAVELENGTH DIVISION MULTIPLEXED OPTICAL NETWORKS

[75] Inventors: Vladimir A. Aksyuk, Piscataway; Bradley P. Barber, Chatham; David J. Bishop, Summit; Clinton R. Giles, Whippany; Lawrence W. Stulz, Shark River Hills; Rene R. Ruel, Bridgewater, all of N.J.

[73] Assignee: Lucent Technologies, Murray Hill, N.J.

[21] Appl. No.: 09/197,388

[22] Filed: Nov. 20, 1998

[51] Int. Cl.⁷ .................................................. G02B 6/28
[52] U.S. Cl. .................. 385/24; 385/37; 385/18; 359/127; 359/130
[58] Field of Search ................................ 385/24, 31, 37, 385/48, 42, 18; 359/127, 130, 124

[56] References Cited

U.S. PATENT DOCUMENTS

| | | | |
|---|---|---|---|
| 5,488,500 | 1/1996 | Glance | 359/127 |
| 5,612,805 | 3/1997 | Fevrier et al. | 359/124 |
| 5,999,290 | 12/1999 | Li | 359/127 |
| 6,069,719 | 5/2000 | Mizrahi | 359/124 |

*Primary Examiner*—Darren Schuberg
*Assistant Examiner*—Fayez Assaf

[57] ABSTRACT

Arrayed waveguide grating routers are used to form 1×N demultiplexers and N×1 multiplexers to form channel drop modules in a WDM optical network. The demultiplexer and the multiplexer are interconnected by optical waveguides in which are inserted optical switches provided by MEMs devices that can be used to reflect incident optical signals backwards for dropping channels or to both transmit and reflect incident optical signals to drop and detect channels.

17 Claims, 3 Drawing Sheets

WAVELENGTH DIVISION MULTIPLEXED OPTICAL NETWORKS

FIELD OF THE INVENTION

This invention relates to an optical network that uses wavelength division multiplexing (WDM) and more particularly to apparatus for adding and dropping channels in such networks, such apparatus generally described as Add-Drop Modules (ADM).

BACKGROUND OF THE INVENTION

As optical communication grows, there is a need for the systems that transmit the signals to grow in capacity. To this end, there is increasing resort to WDM optical networks using optical fibers as the waveguides for transmission. In WDM systems, there is a need to provide at nodes in such systems ADMs that selectively remove one or more channels whose signals are addressed to such nodes and to replace them with new channels originating at such nodes, typically of the same wavelengths as the wavelengths of the dropped channels.

It is important for an optical network to compete successfully in a competitive environment that its ADMs be reliable, rugged, and of low cost.

It is also important that residual leakage of the dropped channels be very small to minimize their interference with the added channels of the same wavelength. This requires low channel crosstalk through the wavelength multiplexers and demultiplexers and high-contrast optical switches that are used in optical networks.

It is also important that the adding and dropping of the channels be done conveniently with little disturbance of the channels being retained.

A variety of apparatus for multiplexing and demultiplexing of optical signals is available for use in the invention. Of special interest are arrayed waveguide grating routers (AWGR) that have proven very adaptable for use in multiplexing and demultiplexing channels. AWGRs comprise a pair of free space planar components, such as star couplers, that are interconnected by a grating composed of an array of waveguide stripes whose lengths differ by prescribed amounts and that are supported on a planar substrate.

SUMMARY OF THE INVENTION

The present invention provides an ADM that employs as one illustrative embodiment a novel reconfigurable drop module (RDM) implemented as a hybrid optical circuit comprising a pair of AWGRs, an array of optical switches, advantageously micro-electro-mechanical systems (MEMs) optical switches, and ancillary optical components. Advantageously, the first of the AWGRs is configured as a 1×N demultiplexer and the other as an N×1 multiplexer. In the wavepaths between the N output ports of the first AWGR and the N input ports of the second AWGR are inserted MEMS optical switches that can be used to reflect incident optical signals corresponding to channels to be dropped at the node where the ADM is provided. The RDM has a drop and transmit capability such that the channels dropped can remain combined on a single optical fiber, suitable for WDM transport away from the RDM node. Other channels can be configured for drop and detect where dropped channels exist on separate fibers that are suitable for local reception. Channel add to provide full ADM capability is obtained using a final-stage coupler.

While other forms of multiplexers can be used, the use of AGWRS is particularly compatible with the use of MEMS devices as the optical switches because of the similarity of fabrication technologies. In particular, switches and routers using planar waveguides on silicon substrates can be integrated by various techniques such as flip-chip bond, with MEMs devices utilizing silicon substrates with subsequent savings in size and cost, using technology that has been used in the manufacture of silicon integrated circuits. An application Ser. No. 09/888,182, filed on Jun. 1, 1998, whose applicants are some of the applicants in the present application and whose assignee is the same as the instant application describes related subject matter (Akysuk et al. 10-2-17-8-36). It may also be possible to integrate them with silicon integrated circuits.

The invention will be better understood from the following more detailed description taken in conjunction with the accompanying drawing.

Figure 1:
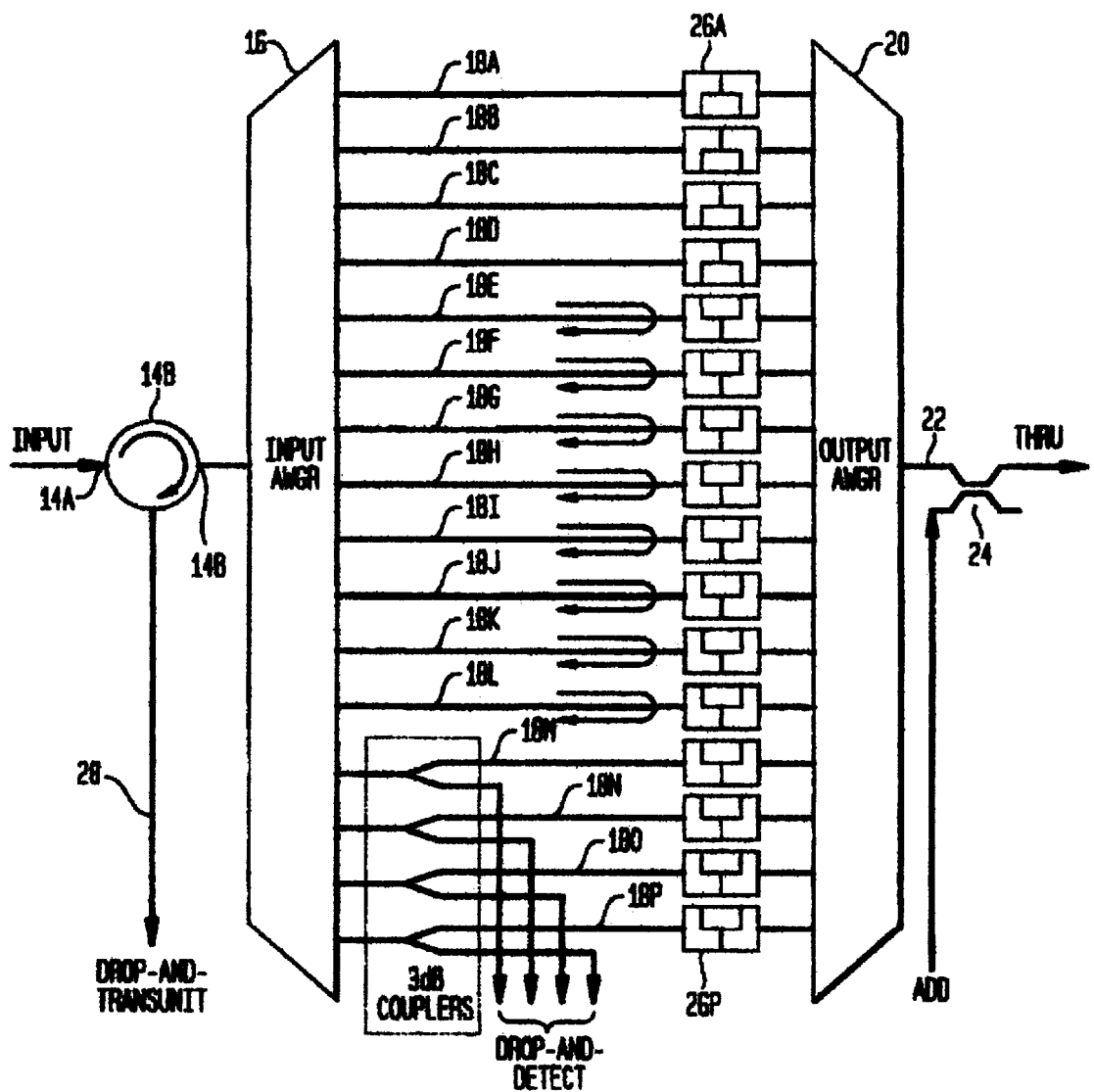
FIG. 1 shows schematically an add-drop module for use in a wavelength division multiplexer network in accordance with an illustrative embodiment of the invention.

It should be noted that the drawing is not to scale.

DETAILED DESCRIPTION

FIG. 1 shows schematically a 16 channel ADM 10 illustrative of an embodiment of the invention. Of course, fewer or more channels are feasible. An input waveguide, typically an optical fiber 12, serves as the input of the ADM. An optical circulator with ports 14A, 14B and 14C is included in the input path for reasons to be discussed later. The input supplies by way of port 14A a sixteen channel input AWGR 16 advantageously of the kind to be described with reference to FIG. 2. Sixteen optical waveguides 18A–18P, typically planar waveguides, interconnect the input AWGR to the output AWGR 20 also to be described with reference to FIG. 2 and its output comprises the output waveguide 22, typically an optical fiber. A directional coupler 24 is coupled to the output waveguide 22 by means of which optical signals of channels to be added are introduced into the waveguide 22 for travel to the next node in the optical network.

Figure 3:
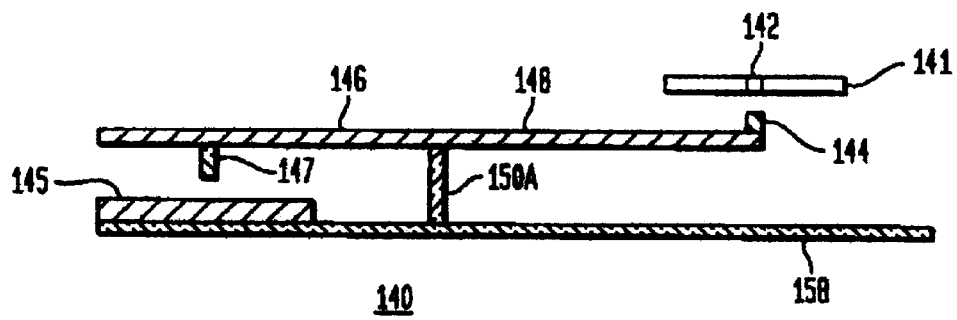
FIGS. 3 and 4 show schematically different views of a MEMS form of a variable reflector for use in the module of FIG. 1.
Figure 4:
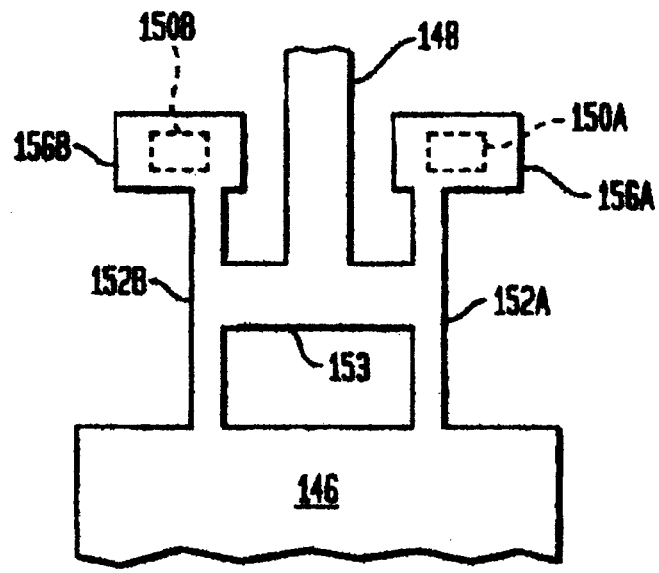

Each of the waveguides 18A–18P between the input and output AWGRs includes along its wave path an optical switch 26A–26P, advantageously a MEMS switch of the kind shown in FIGS. 3 and 4. When closed, as with switches 26A–26D, a switch permits any optical signal exiting an output wave path of AGWR 16 to pass through to an input wavepath of AWGR 20 with minimum loss for further travel along output waveguide 22. When open, as with switches 26E–26L, a switch reflects, desirably with high efficiency, an incident optical signal back through AGWR 16 to exit at the input of AGWR 16 from which it passes into port 14B of circulator 14 and exits at port 14C to enter into waveguide 28, which typically can be an optical fiber, for further independent travel. Such a signal corresponds to a dropped channel.

Wavepaths 18M–18P are provided with three dB couplers so that half of the signal power in each of these passes through the closed switch in its wavepath to the input of waveguide 22. The other half of the signal power in wavepaths 18M–18P that is abstracted by the 3 db couplers passes out in waveguides for use for local reception.

Figure 2:
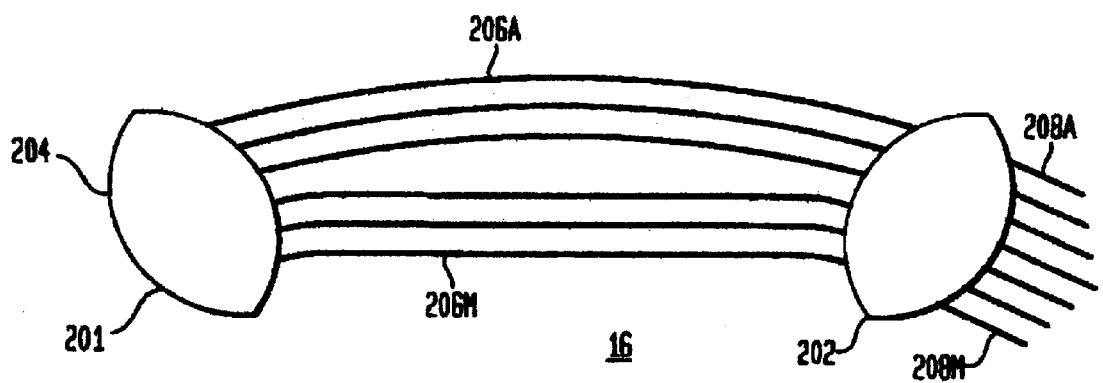
FIG. 2 shows schematically an arrayed waveguide grating router of the kind useful in the module of FIG. 1.

Each of the AWGRs 16 and 20 advantageously is basically a multiplexer of the kind shown in FIG. 2 and described in a paper entitled "Integrated Optics N×N Multiplexer" in *Silicon IEEE Photonics Technology Letters*, Vol. 3, No. 10, October 1991, pps. 896–899 by C. Dragone, C. A. Edwards and R. C. Kistler and this paper is incorporated herein by reference. However, in this invention, AWGR 16 is used as a 1×N demultiplexer, and AWGR 20 as an N×1 multiplexer.

As seen in FIG. 2, for use as a 1×N multiplexer for serving as the AWGR 16, the multiplexer 16 comprises a pair of star couplers 203 and each such coupler includes a dielectric slab forming a free-space region. For use as the AWGR 16, the first of the star couplers 202 includes a single input port 204 and M output ports. The second of the star couplers 203 includes M input ports and N output ports, one for each channel. The number M typically is larger than the number N, the latter being the number of channels being multiplexed. The two couplers are joined by a grating that comprises a symmetric arrangement of M planar waveguides, successive waveguides of the grating differing in length by a constant amount, as described in the reference paper identified above.

Since the AGWRs have reciprocal properties, for use as the AWGR 20, the module shown would be operated in reverse, and the waveguides 208A–208M of star coupler 202 would serve as the input waveguides and input port 104 of star coupler 102 as the output port of the module. It is characteristic of an AWGR of this kind that it is fabricated with wave paths and star couplers that use silica patterns on a planar silicon base and such devices can be adapted for use with MEMS devices that similarly are formed of silicon and silicon oxide layers, as are also silicon integrated circuits. This should permit some integration of components of the MEMS device with the AWGRs and with silicon integrated circuits, as discussed in the aforementioned copending application.

Figure 5:
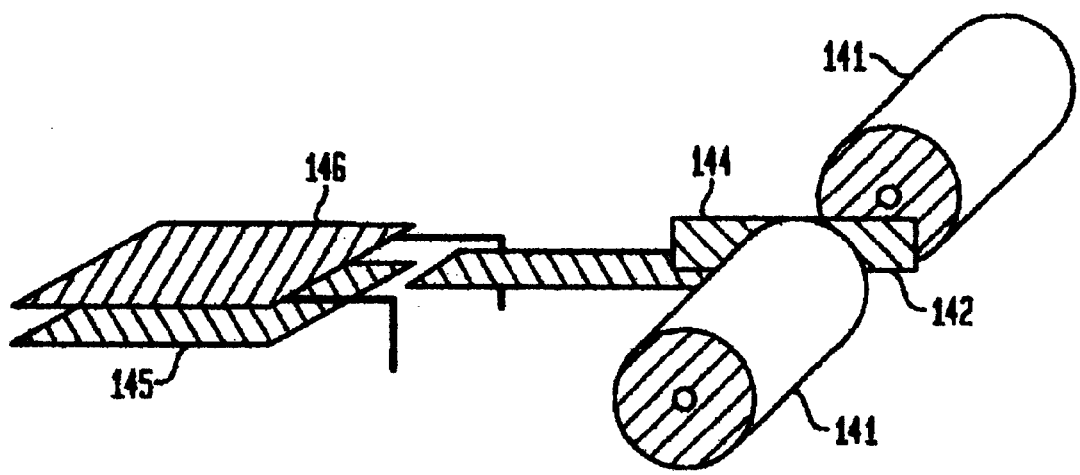
FIG. 5 is a perspective view of the preferred relationship of basic element in the gap portion of the switch.

With reference now to FIG. 3, the optical switch 140 comprises an optical planar waveguide 141 that includes a gap 142 in its wave path, typically about 20 microns wide. The shutter 144 aligned with the gap typically may have a height of about forty microns and, when in its rest position, is not interposed in the critical region of the gap between the two sections of the wavepath. In this figure, the orientation of the shutter 144 in the waveguide gap 142 is schematic. In FIG. 5, there is shown the preferred orientation of the shutter in the waveguide 142 gap the case of an optical fiber 141A for the waveguides. A similar orientation for planar waveguides may also be preferred. The position of the shutter 144 is controlled by an actuator that includes a pair of spaced plates 145, 146, of which upper plate 146 is a thin membrane movable under control of a voltage applied between the two plates. To permit such movement the left end of the upper plate is dangling and the right end is connected to a lever arm 148. With zero voltage applied to the actuator, the shutter 144 does not affect the critical gap region. When the shutter 144 is activated by applying sufficient voltage to the actuator, it is moved to interrupt this critical region and reflect incident light.

The shutter 144 is positioned at the free end of the lever arm 148 and its position is controlled by the top plate 146 of the voltage-controlled actuator formed by the two spaced plates. Each of these plates is made of a different polysilicon layer of a multilayer workpiece that was prepared by silicon surface micromachining in accordance with MEMS technology. MEMS is a technology that exploits lithographic mass fabrication techniques of the kind that are used by the semiconductor industry in the manufacture of silicon integrated circuits. Generally the technology involves forming a multilayer structure by sequentially depositing and shaping layers on a silicon substrate. Layers typically include a plurality of polysilicon layers that are separated by layers of silicon oxide and silicon nitride. The shaping of individual layers is generally done by photolithographic techniques of the kind involved in silicon device manufacture. The technology also may involve the etching of intermediate sacrificial layers of the wafer to release overlying layers for use as thin flexible elements that can be easily moved.

The technology has proven highly versatile and has been used to form a wide variety of miniature devices varying in size from millimeters to microns. MEMS technology is discussed in a paper entitled "MEMS The Word for Optical Beam Manipulation" published in *Circuits and Devices*, July 1997, pp. 11–18.

MEMS devices can be made to order by the MCNC MEMS Technology Application Center, Research Triangle Park, N.C. 27709. The technology is described in "Multiuser MEMS Processes (MUMPS) Introduction and Design Rules,"Rev. 4, Jul. 15, 1996 MCNC Mems Technology Applications Center, Research Triangle Park, N.C. 27709 by D. Keoster, R. Majedevan, A. Shishkoff, and K. Marcus.

Shutter 144 is connected to the movable plate 146 by way of a lever arm 148. As shown in FIG. 4, the lever arm 148 is integral with a brace section 153 that forms with the extension arms 158A, 158B a flexible coupling between the movable plate 146 and the lever arm 148. To provide flexibility that permits upward movement of the lever arm in response to downward movement of the upper plate 146, the arms 152A and 152B are narrow and each extends from a vertical support post 150A, 150B to an end of the movable plate 146. The vertical support posts, of which only is seen in the side view of FIG. 3 are fixed to the substrate 158 that also supports the fixed lower plate 145. At the region where the arms 152A, 152B are supported, each optionally includes an enlarged end portion 156A, 156B. Advantageously, the shutter 144 was rotated 90 degrees to its operating vertical position upon release by a self-assembly mechanism to perform the rotation automatically upon release. The self-assembly mechanism uses energy stored in a high tensile residual stress metal layer to produce vertical motion, which is then used to rotate and lock the shutter in position as is discussed in a paper entitled, "Low Insertion Loss Packaged and Fiber Connectorized Si Surface-Micromachined Reflective Optical Switch" that appeared in the Proceedings of Solid State Sensors and Actuators Workshop at Hilton Head Island, S.C. on Jun. 8, 1998 by applicants of this same application and its teaching is incorporated herein by reference. This paper describes other earlier forms of the MEMS device and the present application describes a later form of the MEMS device that is viewed as an improvement.

To prevent the top plate 146 from touching the bottom plate 145 and shorting the capacitor formed by the two plates, posts 147 (dimples) can be provided protruding from the bottom surface of the top plate. Holes (not seen) should normally also be provided in the bottom plate 146 aligned with the posts 147 such that the posts can pass through the holes to rest on the dielectric layer underlying the bottom plate 146 without touching the plate itself.

The extension arm 148 typically may be about 500 microns long and capable of rotation around the pivot point to provide a desired mechanical advantage. As discussed, the pivot point is provided by the dielectric support posts 150A and 150B and the lever arm is coupled to the top plate of the actuator by the two polysilicon flexures 152A, 152B. Their size is chosen to permit an adequate lever rotation angle for a given separation change between the two plates, without requiring an excessively high voltage to move the top plate sufficiently to provide the necessary lever arm rotation angle. Because of the electrostatic nature of the control, very little power is required to effect the desired control. Moreover because the control involves no rubbing parts, it is essentially frictionless.

In an alternative arrangement, the waveguides 18A–18P can be optical fibers in which there is provided a gap whose transmission properties can be controlled by a shutter provided by a MEMS switch in analogous fashion. In such a case, the gap advantageously is formed by right-angle cleaving the fiber ends and providing anti-reflective (AR) coatings on cleaved end surfaces of the fiber.

In the described embodiment, the shutter has been described as designed to reflect completely incident light in which case the shutter should be designed appropriately. Alternatively, it is feasible, when desired, to move the shutter only enough to partially interrupt the gap so that some light is transmitted and some light is reflected to be abstracted in a suitable manner for transfer to an auxiliary wave path. For example, the shutter may be made, when partially inserted into the gap, to redirect the reflected light either into alternative waveguides or back into source waveguides. This could make unnecessary the need for the three dB couplers for the drop and detect channels shown in FIG. 1. Alternatively, some shutters could be made to both transmit and reflect, with an equivalent effect. Additionally, MEMs devices can be inserted in the wave path as variable optical attenuators with analog control to equalize or vary the desired signal level of individual channels as desired. Suitable MEMs devices are described in our copending applications Akysuk et al. Cases 13-5-22-40-4-11 and 15-6-23-41-5-12 having the same inventors and assignees as the instant application and filed contemporaneously with this application.

It is to be understood that the particular embodiment described is merely illustrative of the general principles of the invention. Various modifications should be possible without departing from the spirit and scope of the invention. In particular, other forms of multiplexers and demultiplexers and other forms of MEMS optical switches might be substituted for the particular forms shown. Additionally known arrangements other than optical circulators can be used to couple out the backward reflected waves for diversion to a new path.

What is claimed:

1. For use in a wavelength division multiplexed optical network, a reconfigurable channel drop module comprising:
   an optical demultiplexer to which an input is to be applied;
   an optical multiplexer from which an output is to be obtained;
   a plurality of optical waveguides interconnecting output ports of the demultiplexer to input ports of the multiplexer, at least some of the waveguides including a gap along its wave path; and
   a micro-electro-mechanical systems (MEMs) device associated with at least some of said waveguides that include a gap along its wave path, each such MEMs device including a shutter element that can be controllably inserted in the gap of its associated waveguide for reflecting controllably incident light backwards to an output port of the demultiplexer for exit at the input port of the multiplexer.

2. A reconfigurable channel drop module in accordance with claim 1 in which the optical waveguides are planar optical waveguides.

3. A reconfigurable channel drop module in accordance with claim 1 in which the optical waveguides are optical fibers.

4. A reconfigurable channel drop module in accordance with claim 1 in which the demultiplexer and multiplexers are arrayed waveguide grating routers.

5. For use in a wave division multiplexed optical network, a reconfigurable drop module comprising:
   an input and an output arrayed waveguide grating router for optical signals,
   optical waveguides interconnecting output ports of said input arrayed waveguide grating router to input ports of said output arrayed waveguide grating router, and a MEMs optical switch in interconnecting waveguides for selectively reflecting optical signals emanating from the output ports of said input arrayed waveguide grating route for backward travel through the output ports of said input arrayed waveguide grating router for exit at its input port.

6. A reconfigurable channel drop module in accordance with claim 5 that includes in the wave path supplying optical signals to the input port of the input arrayed waveguide grating router, a circulator for diverting an optical signal reflected back through said input arrayed waveguide grating router for exit at its input port into a separate wave path.

7. A reconfigurable channel drop module in accordance with claim 1 in which at least one MEMs device reflects part of the light back into its associated source waveguide and transmits part of the light in its associated output waveguide.

8. A reconfigurable channel drop module in accordance with claim 1 in which some of the optical waveguides interconnecting output ports of the demultiplexer to input ports of the multiplexer include couplers for abstracting part of the light traveling in said waveguides.

9. A reconfigurable channel drop module in accordance with claim 8 in which the couplers are 3 db couplers.

10. A reconfigurable channel drop module comprising:
    an optical demultiplexer to which an input optical signal is to be supplied;
    an optical multiplexer from which an output optical signal is to be abstract;
    a plurality of optical waveguides interconnecting output ports of the demultiplexer to input ports of the multiplexer;
    a MEMs device associated with at least one of said optical waveguides that includes a gap along its wave path, said MEMs device including a shutter that can be controllably inserted in said gap for diverting light from said waveguide for exit at other than the output port associated with said waveguide.

11. An add-drop module for use in a wavelength division multiplexed system that comprises a channel drop module in accordance with claim 1 in further combination with a coupler for adding channels to replace dropped channels to the output waveguide of the output multiplexer.

12. A wavelength division multiplexed optical network comprising a reconfigurable channel drop module in accordance with claim 1.

13. A wavelength division multiplexed optical network comprising a reconfigurable channel drop module in accordance with claim 5.

14. A wavelength division multiplexed optical network comprising an add-drop module in accordance with claim 11.

15. A reconfigurable channel drop module in accordance with claim 5 in which the input arrayed waveguide grating router is a 1×N demultiplexer and the output arrayed waveguide grating router is an N×1 multiplexer.

16. A reconfigurable channel drop module in accordance with claim 1 in which the MEMs device includes a pair of plates spaced apart of which one is rigid and the other movable under the control of a voltage applied between the two plates, the movable plate being integral with a lever arm at the end of which is the shutter element.

17. A reconfigurable channel drop filter in accordance with claim 16 in which the lever arm is integral with a flexible section, the flexible section including a pair of flexible arms that are integral with the movable plate, the flexible arms being supported by posts.

* * * * *